Patented Dec. 12, 1933

1,938,911

UNITED STATES PATENT OFFICE

1,938,911

SUBSTITUTED HALOGEN-PHENOLS

Emil Klarmann, Jersey City, and Louis W. Gates, Bloomfield, N. J., assignors to Lehn & Fink, Inc., Bloomfield, N. J., a corporation of Delaware No Drawing. Application October 28, 1932
Serial No. 640,129

9 Claims. (Cl. 260—154)

The present invention relates to improvements in substituted halogen-phenols and particularly in halogen-phenols in which two hydrocarbon radicals are substituted in the ring.

In accordance with the present invention we have formed such halogen-phenols having two hydrocarbon radicals substituted in the ring, in which the sum of the carbon atoms in the two ring-substituting hydrocarbon radicals is at least five, and in which one of the substituting radicals may be an alkyl, cycloalkyl, arylalkyl or other hydrocarbon radical. We have found that such compounds are effective bactericidal agents and are particularly effective with respect to micro-organisms of the type of Staphylococcus aureus.

For simplicity in description of methods for the production of compounds in accordance with our invention, we have referred hereinafter largely to chloro-substituted phenols. It is to be understood, however, that similar methods may be employed, using other halogens, such as bromine or iodine, as the substituents.

A methyl-butyl-halogen phenol may be prepared in the following manner: A halogenated cresol, such as p-chloro-m-cresol is mixed with $ZnCl_2$ in the proportions of 55 parts of the former and 52 parts of the latter, and the mixture is heated to 80° C. Sec.-butyl bromide is added very slowly until the equivalent proportion has been added, while maintaining the mixture at 80 to 90° C., and the heating is continued for some time after the butyl bromide has been added for completion of the reaction. The mixture is extracted with a methyl alcoholic alkali solution and purified, suitably by repeated precipitation and extraction and the resulting compound further purified by vacuum distillation. The resulting product is 3-methyl-6 sec. butyl-4-chlorophenol. It distills at 125–127° C. at 3 mm. hg. Its phenol coefficient with respect to B. typhosus is 50, and with respect to Staph. aureus is 500.

In place of sec. butyl bromide other halogen-substituted hydrocarbons may be employed in the reaction. Instead of the halogen-substituted hydrocarbons, the alcohols may be employed in the reaction.

For example, a methyl-amyl-halogen phenol may be prepared as follows: 72 parts of p-chloro-m-cresol is heated with a mixture of 44 parts of an amyl alcohol (e. g., diethyl carbinol) and 77 parts of concentrated $H_2SO_4$ at a temperature of about 90° C. for three hours, the sulfuric acid-alcohol mixture having been added slowly over a period of one hour with constant stirring. The resulting compound is removed by extraction with methyl alcoholic alkali, and purified by repeated precipitation and re-extraction and finally by vacuum distillation. The product distills at 132–135° C. at 2 mm. hg. Its phenol coefficient with respect to Staph. aureus is 620.

In a similar manner, by condensing p-chloro-m-cresol with n-octyl alcohol in the presence of a condensing agent, such as 88% $H_2SO_4$, 6-sec. octyl-3-methyl-4-chlorophenol may be prepared. On purification it is found to boil at 157–159° C. at 2 mm. hg. It is an effective bactericide.

In the preceding example, sulfuric acid has been referred to as an example of suitable condensing agents. It is readily apparent that other condensing agents may be employed, such as anhydrous zinc chloride, ferric chloride, aluminum chloride and the like.

Compounds according to the present invention may be made in various ways. For example, by reacting on a suitable halogenated phenol having one substituting hydrocarbon radical with an acyl chloride, the corresponding ester may be formed. This, on treatment with a suitable agent, such as $AlCl_3$, forms the corresponding ketone, and the ketone, after purification, may be reduced to form the second hydrocarbon substituting radical. The progress of the reaction may be indicated as follows:

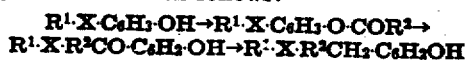

wherein $R^1$ and $R^2$ are hydrocarbon radicals and X represents a halogen atom.

Thus, using initially p-chloro-ortho-cresol and butyryl chloride, there may be produced 2-methyl-4-chloro-6-butyl-phenol. Corresponding derivatives may be prepared by employing initially bromo- or iodo-monoalkyl phenols and by employing other acid chlorides; for example, by using phenyl acetyl chloride, the corresponding 3-methyl-6-phenyl ethyl-4-chlorophenol may be formed.

Instead of employing a halogenated phenol initially, a hydrocarbon substituted phenol may be used and the halogen subsequently introduced. Thus, by employing initially a substituted phenol such as p-$R^1$-$C_6H_4OH$, condensing it with a compound of the formula $R^2Br$ or $R^2OH$, using suitable condensing agents such as sulfuric acid, zinc chloride or aluminum chloride, and halogenating the product, a compound of the formula

may be formed, $R^1$ and $R^2$ indicating hydrocarbon radicals and X a halogen.

Other methods of forming products in accordance with the present invention may be employed. For example, by reacting on para-ethyl-phenol with propionyl chloride, ethyl-phenyl-propionate is produced. It is separated, purified and treated with AlCl₃, a rearrangement taking place with the formation of 5-ethyl-2-hydroxy propiophenone. On reduction of this compound 4-ethyl-2-propyl-phenol is formed and on treatment of the latter with sulphuryl chloride, 4-ethyl-2-propyl-6-chloro-phenol is produced. It distills at 116° C. at 3 mm. hg. and has a high bactericidal value. By using other halogenating agents, other halogen groups may be introduced.

In compounds of the present invention, it is our belief that the total molecular weight of the substituting hydrocarbon radicals is of importance in securing products of high bactericidal potency and we have found that compounds in which the sum of the carbon atoms in the two substituting hydrocarbon radicals is at least 5 are highly effective bactericides, and particularly with respect to organisms of the type of *Staphylococcus aureus*.

We claim:
1. A mono-halogenated phenol having two substituting hydrocarbon radicals in the ring, the sum of the carbon atoms of the two substituting radicals being at least 5.
2. A dialkyl mono-halogenated phenol in which the sum of the carbon atom of the two alkyl groups is at least 5.
3. A dialkyl chloro-phenol in which the sum of the carbon atoms of the two alkyl groups is at least 5.
4. An alkyl-arylalkyl halogen phenol.
5. An alkyl-phenoyl ethyl chlorophenol.
6. 3-methyl-6-(diethyl methyl)-4-chlorophenol.
7. A 3-methyl-6-alkyl-4-halogen-phenol.
8. 4-ethyl-2-propyl-6-chlorophenol.
9. 3-methyl-6-phenylethyl-4-chlorophenol.

EMIL KLARMANN.
LOUIS W. GATES.

CERTIFICATE OF CORRECTION.

Patent No. 1,938,911.　　　　　　　　　　　　　　　　December 12, 1933.

EMIL KLARMANN, ET AL.

It is hereby certified that error appears in the printed specification of the above numbered patent requiring correction as follows: Page 1, lines 40, 60 and 67, and page 2, line 12, respectively, for "hg" read Hg; page 2, line 90, claim 5, for "alkyl-phenoyl" read alkyl-phenyl; and that the said Letters Patent should be read with these corrections therein that the same may conform to the record of the case in the Patent Office.

Signed and sealed this 16th day of January, A. D. 1934.

(Seal)　　　　　　　　　　　　　　　　F. M. Hopkins
　　　　　　　　　　　　　　　　Acting Commissioner of Patents.

Other methods of forming products in accordance with the present invention may be employed. For example, by reacting on para-ethyl-phenol with propionyl chloride, ethyl-phenyl-propionate is produced. It is separated, purified and treated with AlCl₃, a rearrangement taking place with the formation of 5-ethyl-2-hydroxy propiophenone. On reduction of this compound 4-ethyl-2-propyl-phenol is formed and on treatment of the latter with sulphuryl chloride, 4-ethyl-2-propyl-6-chloro-phenol is produced. It distills at 116° C. at 3 mm. hg. and has a high bactericidal value. By using other halogenating agents, other halogen groups may be introduced.

In compounds of the present invention, it is our belief that the total molecular weight of the substituting hydrocarbon radicals is of importance in securing products of high bactericidal potency and we have found that compounds in which the sum of the carbon atoms in the two substituting hydrocarbon radicals is at least 5 are highly effective bactericides, and particularly with respect to organisms of the type of *Staphylococcus aureus*.

We claim:
1. A mono-halogenated phenol having two substituting hydrocarbon radicals in the ring, the sum of the carbon atoms of the two substituting radicals being at least 5.
2. A dialkyl mono-halogenated phenol in which the sum of the carbon atom of the two alkyl groups is at least 5.
3. A dialkyl chloro-phenol in which the sum of the carbon atoms of the two alkyl groups is at least 5.
4. An alkyl-arylalkyl halogen phenol.
5. An alkyl-phenoyl ethyl chlorophenol.
6. 3-methyl-6-(diethyl methyl)-4-chlorophenol.
7. A 3-methyl-6-alkyl-4-halogen-phenol.
8. 4-ethyl-2-propyl-6-chlorophenol.
9. 3-methyl-6-phenylethyl-4-chlorophenol.

EMIL KLARMANN.
LOUIS W. GATES.

CERTIFICATE OF CORRECTION.

Patent No. 1,938,911.   December 12, 1933.

EMIL KLARMANN, ET AL.

It is hereby certified that error appears in the printed specification of the above numbered patent requiring correction as follows: Page 1, lines 40, 60 and 67, and page 2, line 12, respectively, for "hg" read Hg; page 2, line 90, claim 5, for "alkyl-phenoyl" read alkyl-phenyl; and that the said Letters Patent should be read with these corrections therein that the same may conform to the record of the case in the Patent Office.

Signed and sealed this 16th day of January, A. D. 1934.

(Seal)

F. M. Hopkins
Acting Commissioner of Patents.